United States Patent [19]

Zimmerly

[11] 4,296,951
[45] Oct. 27, 1981

[54] SPHEROIDAL INTERCONNECTOR FOR FILTRATION MODULES

[75] Inventor: Robert D. Zimmerly, Kenosha, Wis.

[73] Assignee: Ladish Co., Cudahy, Wis.

[21] Appl. No.: 53,636

[22] Filed: Jun. 29, 1979

[51] Int. Cl.³ .................................. F16L 17/00
[52] U.S. Cl. .............................. 285/95; 285/138; 285/369; 285/383; 285/DIG. 16
[58] Field of Search ............... 285/383, 369, 417, 423, 285/DIG. 20, 235, DIG. 7, DIG. 11, 95, 138, DIG. 16

[56] References Cited

U.S. PATENT DOCUMENTS

| | | | |
|---|---|---|---|
| 3,177,015 | 4/1965 | Brown | 285/383 X |
| 3,465,529 | 9/1969 | Heile | 285/235 X |
| 3,558,164 | 1/1971 | Havell | 285/423 X |
| 3,677,575 | 7/1972 | Wedel | 285/423 |
| 3,979,142 | 12/1974 | Fujisawa | 285/235 |
| 4,165,104 | 8/1979 | Beld | 285/423 |
| 4,213,641 | 7/1980 | Bennett | 285/369 |

FOREIGN PATENT DOCUMENTS

| | | | |
|---|---|---|---|
| 581937 | 8/1959 | Canada | 285/DIG. 11 |
| 2501273 | 7/1976 | Fed. Rep. of Germany | 285/235 |
| 524175 | 4/1955 | Italy | 285/383 |
| 365375 | 1/1932 | United Kingdom | 285/383 |
| 465115 | 4/1937 | United Kingdom | 285/235 |
| 1365151 | 8/1974 | United Kingdom | 285/383 |

Primary Examiner—Dave W. Arola

[57] ABSTRACT

An interconnector for the coaxially adjacent permeate tubes of filtration apparatus comprises a molded elastomeric spheroidal body having opposed coaxial bores for receiving the tube ends which extend from filter membrane modules. Complementarily shaped interdigitated pairs of anti-telescoping devices are interposed between membrane modules in mutual interacting relationship and without contacting the interconnector.

7 Claims, 7 Drawing Figures

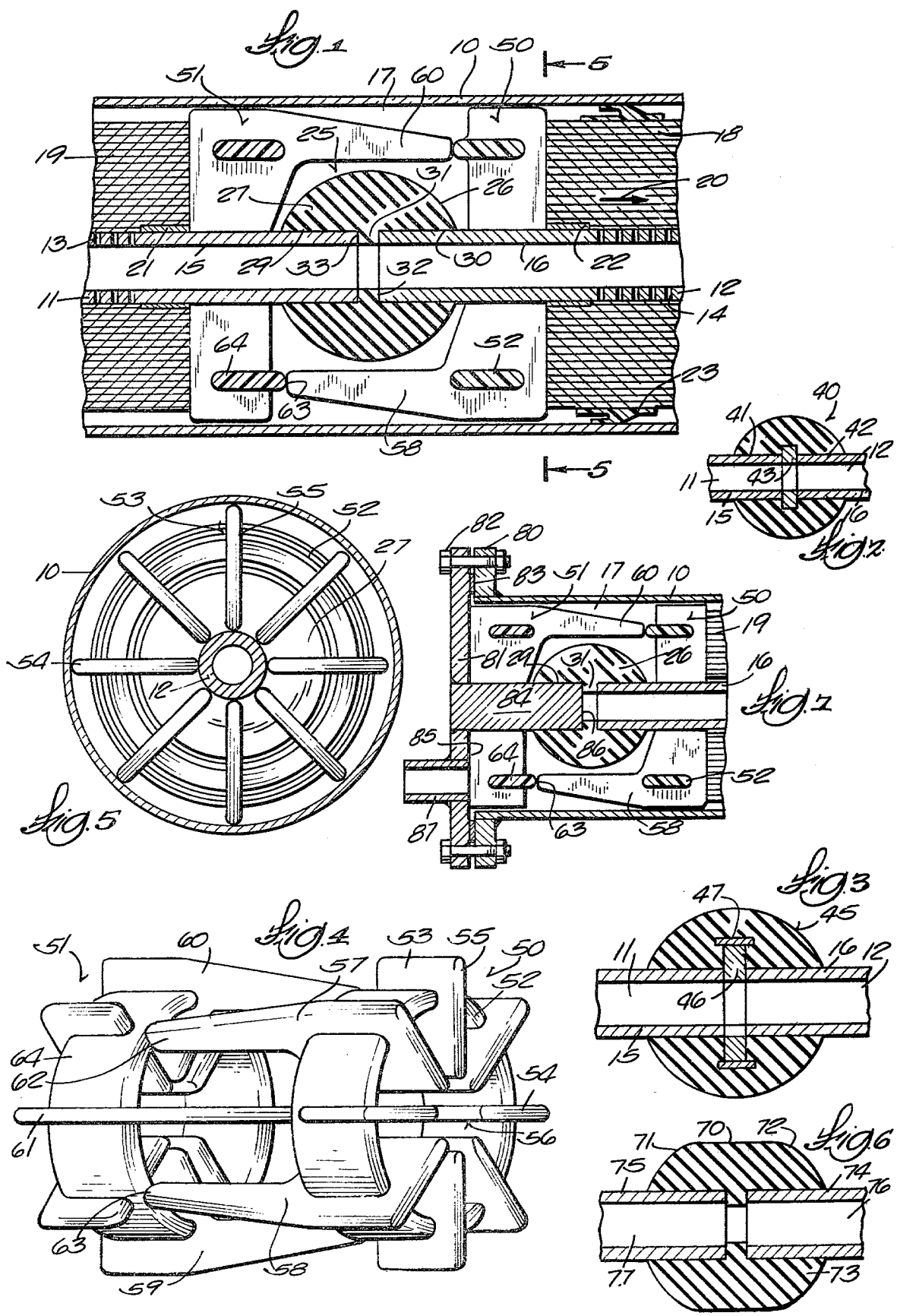

SPHEROIDAL INTERCONNECTOR FOR FILTRATION MODULES

This invention relates generally to ultrafiltration and reverse osmosis apparatus, and in particular, to improvements in the interconnectors and anti-telescoping devices used in such apparatus.

Typical ultrafiltration apparatus in which the present invention may be used comprises a filter membrane which is spirally wound on a permeate tube. A series of such membrane and tube combinations are disposed in a cylindrical pressure resistant vessel in series relationship, that is, with the permeate tubes arranged coaxially with each other so that they can be interconnected. Each permeate tube has a multiplicity of small holes in the part of its length which is overlayed by the spiral wound membrane to allow the permeate which is extracted from the fluid product being filtered to flow into the tubes for being conducted away. The imperforate ends of the permeate tubes extend into a free space within the pressure vessel and interconnectors are used to connect the tubes in series in this space.

A variety of interconnectors have been developed. One type is simply a metal sleeve which slips over the ends of adjacent permeate tubes. The sleeve has internal annular grooves which accommodate o-rings that effect a seal. A major disadvantage of this type of connector is that it provides cavities in which solid materials from the product being filtered may accumulate and provide a site for bacterial growth, thus making this type of interconnector inappropriate for use in food processing ultrafiltration apparatus. Reversing the flow direction periodically in the filter units, as is common practice, is usually ineffective to clean out the cavities.

Another well-known type of permeate tube interconnector comprises a cyindrical metal sleeve which has an internal liner consisting of a rubber tube whose opposite ends are tapered axially to form lips. When the ends of the rubber tube are slipped over the ends of adjacent permeate tubes the lips remain exposed for being acted on by fluid pressure to effect a seal at the interface of the rubber tube and the permeate tube. With this type of interconnector, the internal diameter of the rubber tube must be larger than the outside diameter of the permeate tube to enable assembly so small cavities often develop at the interface of the rubber tube and the permeate tube when there is no pressure applied to the tapered lip seal. When fluid pressure is applied, the rubber is displaced into the cavities, causing a shear force to be developed on the critical bonded surface between the rigid outside sleeve and the rubber tube which results in shortened useful life of the interconnector. Another disadvantage of the prior art interconnectors that use a rubber tube within a rigid outer sleeve is that disassembly of the tubes is difficult. This is so because at least small areas of the rubber tube at the interface with the permeate tube becomes seized after extended use, thus making it difficult to pull the connector off of the permeate tube when disassembly of the apparatus is required. Because of the rigidity of the outer sleeve, it is impossible to rock the connector or tubes sideways to work the tubes free for axial withdrawal. Special tools are required for disassembly.

Also to be considered are the anti-telescoping devices (ATDs) which are used in connection with the spiral-wound membrane modules. The modules are inclined to distend or telescope axially on the permeate tubes when they are subjected to sustained pressure. The customary solution to the telescoping problem is to interpose axially conductive rigid anti-telescoping devices between an end of the membrane module and the interconnector so that the interconnector will provide the reactive force for restraining the module in proper axial location. Since the anti-telescoping devices react on one end of the rigid part of each interconnector a shear force is developed on the washer in the connector which is sufficient to shear the washer over an extended time. During cleaning, flow is reversed and the anti-telescoping device on the opposite end of the interconnector exerts a shear force on the washer in the opposite direction.

SUMMARY OF THE INVENTION

A new interconnector is provided which overcomes the previously mentioned problems of prior art interconnectors. The new connector is distinguished by its structural simplicity, by its adaptation to the various fluid pressure ranges, by its unitary construction, by the ease with which it may be assembled and disassembled, and by a unit force amplification characteristic which enhances its sealing effectiveness. An adjunct to the new connector is a new anti-telescoping device (ATD) which permits mutual interaction with an adjacent ATD but, most importantly, with no reactive forces being applied to the interconnector.

In accordance with the invention, the interconnector comprises a molded spheroidal body of elastomeric material having coaxial bores for receiving the respective ends of axially adjacent permeate tubes in snug fitting relationship. An annular elastomeric element extends from the body radially inwardly of the bores and has axially spaced apart end surfaces for the ends of the adjacent permeate tubes to butt against when the tubes are in the bores. The annular element has an inside opening that is coaxial with the interconnector and tube bores and has an outside peripheral margin that is integral with or bonded in the spheroidal body.

The term "spheroidal body" as used herein is intended to embrace interconnector shapes defined by a curved line or combination of connected curved line and straight line segments that is rotated about an axis of revolution to define the peripheral or outside surface configuration of the molded interconnector.

The new anti-telescoping device (ATD) is preferably made of synthetic resin and comprises a base ring from which spokes radiate. Corresponding axial edges of the spokes interface with the ends of the membrane modules. The space between spokes permits axial fluid flow. Integral prongs project from some of the spokes in a common axial direction. The ATDs are used in pairs so that there is mutual interaction between the tips of the prongs of one and the ring of the other. The prongs are at such radial distance that neither they nor any other part of the anti-telescoping devices contact the interconnector which is disposed between them.

A more detailed description of an illustrative embodiment of the invention will now be set forth in reference to the drawing.

DESCRIPTION OF THE DRAWING

FIG. 1 is a longitudinal section of a portion of an ultrafiltration device showing a cylindrical pressure vessel, end portions of adjacent filtration modules on central permeate tubes and one version of the new interconnector in conjunction with the new anti-telescoping device;

FIG. 2 is a longitudinal section of another version of the new interconnector installed on the end portions of adjacent permeate tubes;

FIG. 3 is a longitudinal section of still another version of the new interconnector;

FIG. 4 shows a pair of anti-telescoping devices in perspective and isolated from the FIG. 1 apparatus;

FIG. 5 shows the base end of the anti-telescoping device as viewed in the direction of the arrows 5—5 in FIG. 1;

FIG. 6 is an illustrative alternative interconnector which has the basic features of those shown in FIGS. 1-3; and FIG. 7 shows how the new interconnector may be used at the blind end of a filtration unit.

DESCRIPTION OF A PREFERRED EMBODIMENT

FIG. 1 shows those components of an ultra-filtration apparatus which are pertinent to describing the present invention. The apparatus comprises a cylindrical pressure vessel 10 which is usually of metal and capable of resisting high pressures which may range from 150 psi to about 650 psi or even higher. Disposed centrally within cylindrical pressure vessel 10 are serially arranged permeate tubes 11 and 12 which have a plurality of permeate holes or passageways such as 13 and 14 over a substantial portion of their lengths. The end portions 15 and 16 are imperforate and extend into a space 17 within the cylinder. In this example, permeate tubes 11 and 12 have filter membranes such as 18 and 19 spirally wound on them which is a well-known construction. As is conventional practice, the fluid solution or suspension or product as it is called which is to be filtered is forced under pressure serially and generally axially through the membrane modules 18 and 19 in the direction indicated by the arrow 20. Periodically, the filter units are backwashed by reversing the flow direction for the purpose of purging the unit of trapped solids and fluids.

The spiral wound membranes comprising the modules 18 and 19 are fastened rigidly to the permeate tube with glue as indicated where the reference numerals 21 and 22 are applied. Membrane modules 18 and 19 are supported concentrically within pressure vessel 10 with ATDs 50 and 51. The seals 23 are glued to the outside diameters of the modules to assure flow through the modules and not around them. The product flowing through the modules and against the lip seals tends to cause the outer layers of the spirally wound membrane to telescope or distend downstream. The anti-telescoping devices, which are identified generally by the numerals 50 and 51 in FIG. 1, prevent telescoping and have some other desirable properties which will be discussed after the new interconnector has been described.

One version of the new interconnector for coupling the imperforate ends 15 and 16 of the permeate tubes is shown in FIG. 1 and is generally designated by the reference numeral 25. This version is molded in one piece of an elastomeric material such as rubber. From a geometrical point of view, the interconnector 25 may be characterized as a spheroid of revolution generated by rotating a segment 26 of a curve around a central axis to form a body 27. As shown, the curve 26 constitutes a segment of an arc of a circle but it will be understood that it could be a segment of an elipse or other, preferably uniform, curved line but it could include straight line segments too. A pair of coaxial bores 29 and 30 are formed in the spheroid or ball during the molding process. These bores are separated axially by an annular element 31 which extends radially into the bores and provides opposite side faces 32 and 33 against which the ends of the respective permeate tubes 11 and 12 abut.

Because of the elasticity of the spheroidal body, the bores 29 and 30 may be molded with a diameter which is a few thousandths of an inch under the outside diameters of the permeate tubes. Thus, a snug fit and effective seal is obtained immediately when the permeate tube ends are pushed into the bores even though there is no external fluid pressure acting on the spheroidal body at this time.

On some occasions, the filter modules are withdrawn from the cylindrical pressure vessel 10 for the purpose of inspection or replacement of parts. On these occasions, separation of the permeate tubes 11 and 12 from interconnector 25 may be contemplated. In prior art devices, as explained earlier, it was ordinarily necessary to exert a straight or in-line pull on both of the permeate tubes to withdraw them from the interconnector because the rigidity of the interconnector outer retaining sleeve prevented rocking or tilting the tubes out of alignment to break the seizure between the permeate tubes and the rubber interconnector tube. Special tools, not shown, were required to extract the tubes from the bores. This handicap is avoidable with the new connector 25. Since the connector body 25 is totally elastic and pliable it is possible to tilt the permeate tubes out of true axial alignment to thereby produce enough flexure at the interface of the interconnector bores and the permeate tubes to free the latter so they can be withdrawn easily in the axial direction.

The new spheroidal or ball-type interconnector 25 has force multiplying characteristics which enhance sealing. This results from the external area of the spheroid, defined by its curved peripheral surface 26, being greater than the area of the interface between the internal walls of the bores 29 and 30 and the outside peripheral surfaces of permeate tube ends 15 and 16. For instance, when vessel 10 has internal fluid pressure a certain total fluid pressure is applied to the external surface of the ball-shaped or spheroidal body 25, a certain unit force or pressure per area unit, such as a square centimeter. This total force is transmitted through the elastomeric ball to the interface between the walls of the bores 29 and 30 and the permeate tube ends 15 and 16, respectively. The interfacing area between the bores and permeate tubes is considerably less than the external or peripheral area of the spheroid so the unit stress or force at the interface is substantially greater than the unit force on the outside of the spheroid. The unit force multiplication, that is made possible by using an elastomeric spheroid which is not captured in a rigid sleeve, results in more effective sealing. Moreover, the elasticity of the spheroidal interconnector body enables it to seal the permeate tubes without cavities developing in the interfacing area between the bore walls and the permeate tube ends.

The version of the interconnector 25 shown in FIG. 1 comprises a spheroidal body portion 27 and a radially inwardly extending annular element 31 which are integral, that is, molded as a single piece. This version of the interconnector is used for the lowest in a series of pressure range ratings which are applicable to this and other versions of the spheroidal interconnector that are depicted in FIGS. 2 and 3. The interconnector 25 in FIG. 1 may be molded from Buna N rubber having an indentation hardness of about 60 to 70 on the type A Durometer scale. Other elastomeric materials having substantially the same physical properties as this rubber could be used. For example, an elastomeric material known by the tradename Viton or another known as EPT (ethylene propylene terpolymer) could be used.

FIG. 2 shows another version of the elastomeric interconnector body which is generally designated by the reference numeral 40. The body of the interconnector may be composed of one of the materials mentioned in the preceding paragraph. The end portions 15 and 16 of permeate tubes 11 and 12 are fitted into the bores 41 and 42 of the spheroidal body 40. As in the previously described version of the interconnector, the inside diameters or walls diameters of the bores 41 and 42 are slightly smaller than the outside diameters of the permeate tubes 11 and 12 so that the tubes fit into the interconnector snuggly and in sealing relationship even though no external pressure is being applied to the spheroidal periphery of the interconnector body.

In the FIG. 2 version, the radially inwardly extending annular element 43, which corresponds with annular element 31 in the FIG. 1 embodiment, is comprised of an elastomeric material which has a higher durometer than the spheroidal body 40. This is to adapt the FIG. 2 version for higher pressure applications. The annular element 43 is essentially a washer which is treated with a bonding agent and bonded into the body 40 during the molding process so as to effectively become integral with the main softer body. In the FIG. 2 version of the interconnector, the body 40 is preferably molded from the same kind of rubber as the body of the interconnector in the FIG. 1 version. Annular element 43, however, is preferably molded from Buna N rubber or other elastomeric material having an indentation hardness of about 50 to 55 on the type D Durometer scale. The indentation hardnesses specified herein are determined in accordance with American Society for Testing Materials (ASTM) standard: Designation D2240-68 or American National Standard K65.63-1971.

A version of the interconnector for still higher pressure applications is illustrated in FIG. 3. In this version, the spheroidal body 45 may be composed of any of the materials used for the body 40 in the FIG. 2 embodiment. The bonded elastomeric annular element 46 may also be of the same material as the annular element 43 in the FIG. 2 version. In this embodiment, a metal ring 47 surrounds annular element 46 to further stiffen the assembly as is desirable for very high pressure applications. Nevertheless, the FIG. 3 version preserves the advantageous features of the previously described embodiments which are to avoid shear forces being created at the interfaces, effect force amplification, maintain the ability to move the permeate tubes with side motion so they can be worked loose from the interconnector for disassembly and to maintain substantial sealing force such as to avoid cavitation at the interface even though external pressure on the spheroidal body has been relieved.

FIG. 6 illustrates a version of the interconnector whose peripheral outline is defined by a line of revolution comprised of a straight line segment 70 and opposite end segments 71 and 72 which are curved. Thus, in the central region, the body 73 of elastomeric material is cylindrical and only the ends are rounded. This basically spheroidal configuration also has the property of transmitting pressure applied to the large external area defined by lines or surfaces 70–72 through body 73 to a smaller interfacing area between bores 74 and 75 in the body and the outer peripheries of permeate tubes 76 and 77. This low pressure version can be modified to include the separate washer 43 used in the FIG. 3 embodiment and/or the ring 47 used in the FIG. 4 embodiment.

The new anti-telescoping device which may be used with the interconnector will now be described. Two ATD devices are identified by the reference numerals 50 and 51 in the FIG. 1 unit and are preferably formed from rigid synthetic resin. A cooperating pair of these devices is illustrated in isolation from said unit in FIG. 4. Taking ATD 50 as an example, it comprises a base portion including a ring 52 on which a plurality of radially extending spokes such as those marked 53 and 54 are molded integrally. The base or end faces of the spokes such as the one marked 55 all butt against the end of spirally wound filter module 18 as shown in FIG. 1. As can be seen in FIG. 4, the spokes terminate short of the central axis of the device so as to provide an opening 56 which permits the device to be slid onto the permeate tubes as shown in FIG. 1.

Some of the spokes have prongs or fingers such as those marked 57 and 58 extending axially and integrally from them. As can be seen in FIG. 4, the prongs on one device can be arranged in complementary or interdigital fashion relative to corresponding prongs 59, 60 and 61 on the other 51 of the two identical anti-telescoping devices 51 and 52 depicted in FIG. 4. The tips 62 and 63 of prongs 57 and 58, respectively, strike against the end of the ring 64 of the adjacent anti-telescoping device so that axial forces are interchanged mutually between the two devices and they maintain their separation.

As can be seen in FIG. 1, the axially extending prongs such as 58 and 60 are at such radial distance from the axes of the anti-telescoping devices that they do not make any contact with the spheroidal interconnector. In fact, no part of the anti-telescoping devices makes contact with the interconnector so there is no interactive force transferred from the telescoping devices to the interconnector. This minimizes loading on each interconnector, obviates shear stress and contributes to increasing its useful service life. Moreover, no cavities or traps are created by either the interconnector or the ATDs wherein residues from the product might accumulate and provide a site for bacterial growth.

Inspection of FIG. 4 in conjunction with FIG. 5 reveals how substantial openess is maintained for free flow of the product in the axial direction through cylinder 10. In addition, one may see that a secondary benefit of the anti-telescoping device is that it centers the filtration modules in the outer pressure vessel 10 so that the lip seal 22, see FIG. 1, performs its function properly and is not deformed.

FIG. 7 shows how the end of a filtration unit may be constructed and sealed. Parts in this figure which are structurally similar to parts in other figures have been given the same reference numerals as in other figures.

In FIG. 7 cylindrical pressure vessel 10 has a flange 80 welded on it. A basically solid flange or end cap 81 cooperates with flange 80 to close the end of vessel 10. End cap 81 and flange 80 are pressed together with an array of bolts such as the one marked 82 and there is a gasket 83 at the interface of cap 81 and flange 80 for sealing. A solid cylindrical member 84 is welded into the center of end cap 81. Solid member 84 extends from the inside face 85 of end cap 81 into space 17 by the same amount that the imperforate end portion 16 of permeate tube member 12 extends into space 17 from the end of membrane module 18. End cap 81 has an inlet/outlet pipe 87 to allow getting fluid in one end of the unit and out of the other end. The inside end 86 of solid member 84 and the imperforate end 16 of tubular member or permeate tube 12 are coupled and sealed with one of the new spheroidal interconnectors 25. Because extending member 84 is solid, this results in the end of the permeate tube member being closed and sealed.

A pair of the new ATDs 50 and 51 are employed to prevent telescoping of a wound filter module, such as the one marked 18, on the permeate tube. The base of ATD 51, in this case, reacts against inside face 85 of end cap 81 as opposed to it reacting against another filter module as its counterpart does in FIG. 1. The other ATD 50 reacts against a filter module such as module 19 and the two ATDs interact with each other as in the FIG. 1 example.

Those who are familiar with filtration equipment will understand that instead of using a solid cylindrical member 84, a tubular member, not shown, could be substituted as is done at the opposite end, not shown, of the filtration vessel. This would be a permeate fluid output tube. A tube of this type extends out of the vessel some distance from the outside face of end cap 81 and enables making an external connection. Within vessel 10, however, the tube may be connected to the end of a permeate tube to effect the required seal with one of the new interconnectors and, of course, a pair of ATDs would be used in the manner demonstrated in FIG. 7.

Although the various versions of the new interconnector and an embodiment of the new anti-telescoping device have been described in considerable detail, such description is intended to be illustrative rather than limiting, for the basic principles of the invention may be variously embodied and are to be limited only by interpretation of the claims which follow.

I claim:

1. A coupling assembly comprising two coaxial conduit members, an interconnector means for coupling and sealing said coaxial members, and wall means defining a pressure chamber around said members adapted to contain a pressurized fluid between said members and said wall means, said interconnector means having a spheroidal body located within said pressure chamber and comprised of elastomeric material, said body having coaxial bores extending into it from opposite sides for receiving the respective ends of said members in a snug fitting relationship, and said body being operative to transmit pressure exerted by the fluid on its outside surface to the surface constituting the interface area between said bores and the members in the bores, the area of said outside surface of the body being substantially larger than said interface area so that the force on a unit area of said interfacing surface is greater than the force exerted by said fluid on a unit area of said outside surface to enhance the seal between said members.

2. The interconnector means as in claim 1, including an annular element extending from said body radially inwardly of said bores and having axially spaced apart end surfaces for the ends of the respective members to butt against when said members are in the respective bores.

3. The interconnector means as in claim 2 wherein said elastomeric material comprising said body and annular element has an indentation hardness of about 60 to 70 on the type A Durometer scale.

4. The interconnector means as in claim 2 wherein said annular element which extends into said bores is bonded in said body, and said annular element is comprised of an elastomeric material which has a higher durometer than the material of which said body is comprised.

5. The interconnector means as in claim 4 wherein the body material has a durometer of about 60 to 70 on the type A Durometer scale and the annular element material has a durometer of about 50 to 55 on the type D Durometer scale.

6. The interconnector means as in any of claims 2, 3, 4 or 5 wherein said body and annular element materials are Buna N rubber.

7. The interconnector means as in claim 4 including: a metal annulus embedded in said body concentrically with and contiguous with the outer periphery of the elastomeric annular element which is bonded in said body.

* * * * *